US010246820B2

(12) United States Patent
Kaplan et al.

(10) Patent No.: US 10,246,820 B2
(45) Date of Patent: *Apr. 2, 2019

(54) INDIGO-DERIVATIVES AS IRREVERSIBLE COLOR CHANGEABLE DYES FOR TEXTILE MATERIALS AND PROCESS FOR DYEING TEXTILE MATERIALS

(71) Applicant: Sanko Tekstil Isletmeleri San. Ve Tic. A.S., Inegol-Bursa (TR)

(72) Inventors: Gokhan Kaplan, Inegol-Bursa (TR); Ozgur Akdemir, Inegol-Bursa (TR); Ozgur Cobanoglu, Inegol-Bursa (TR)

(73) Assignee: Sanko Tekstil Isletmeleri San. Ve Tic. A.S., Inegolbursa (TR)

( * ) Notice: Subject to any disclaimer, the term of this patent is extended or adjusted under 35 U.S.C. 154(b) by 61 days.

This patent is subject to a terminal disclaimer.

(21) Appl. No.: 15/498,580

(22) Filed: Apr. 27, 2017

(65) Prior Publication Data
US 2017/0362771 A1    Dec. 21, 2017

(30) Foreign Application Priority Data

Jun. 17, 2016  (EP) .................................. 16174973

(51) Int. Cl.
*C09B 7/04*   (2006.01)
*D06P 1/22*   (2006.01)
(Continued)

(52) U.S. Cl.
CPC ................ *D06P 1/228* (2013.01); *C09B 7/04* (2013.01); *D06M 10/005* (2013.01);
(Continued)

(58) Field of Classification Search
CPC ...... D06P 1/228; D06P 3/6025; D06P 5/2005; C09B 7/04; D06M 10/005; D10B 2501/00
See application file for complete search history.

(56) References Cited

U.S. PATENT DOCUMENTS

| 5,243,052 | A | 9/1993 | Taylor et al. |
| 2001/0039358 | A1* | 11/2001 | Hao .................. C09B 1/005 552/212 |

(Continued)

FOREIGN PATENT DOCUMENTS

| EP | 0408269 | 1/1991 |
| EP | 0648817 | 4/1995 |

(Continued)

OTHER PUBLICATIONS

STIC Search Report (dated Aug. 14, 2018).*
(Continued)

*Primary Examiner* — Eisa B Elhilo
(74) *Attorney, Agent, or Firm* — Silvia Salvadori

(57) ABSTRACT

Provided are novel compounds of indigo-derivatives as irreversible color changeable dyes. Also provided are methods for the use of various indigo-derivatives for irreversibly color changeable dyes for textile materials and to novel compounds. Also provided is a process for dyeing textile materials, especially denim, with indigo-irreversible color changeable dyes and for textiles and garment articles made by the dyeing process for textile materials.

22 Claims, 9 Drawing Sheets
(2 of 9 Drawing Sheet(s) Filed in Color)

(51) Int. Cl.
  *D06M 10/00* (2006.01)
  *D06P 3/60* (2006.01)
  *D06P 5/20* (2006.01)

(52) U.S. Cl.
  CPC .......... *D06P 3/6025* (2013.01); *D06P 5/2005* (2013.01); *D10B 2501/00* (2013.01)

(56) References Cited

U.S. PATENT DOCUMENTS

| | | |
|---|---|---|
| 2002/0123005 A1 | 9/2002 | Ichimura et al. |
| 2004/0067537 A1 | 4/2004 | Hahn et al. |
| 2007/0033748 A1 | 2/2007 | Arioglu et al. |

FOREIGN PATENT DOCUMENTS

| | | |
|---|---|---|
| EP | 1498541 | 1/2005 |
| EP | 1840172 | 10/2007 |
| JP | 7-150068 | 6/1995 |
| WO | 9314257 | 7/1993 |
| WO | 9832800 | 7/1998 |

OTHER PUBLICATIONS

International Search Report dated Apr. 24, 2017 for corresponding PCT/EP2017/053810.
European Search Report dated Dec. 12, 2016 for priority application No. 16174973.4.
Bora Yoon et al: Patterned Fluorescence Images with Indigo Precursors in Polymer film Bullettin of the Korean Chemical Society, Apr. 20, 2013, 1282-1285.
Eric Daniel Glowacki et al "A facile protection-deprotection route for obtaining indigo pigments as thin films and their applications in organic bulk heterojunctions," Chem. Commun. 2013, 49, 6063.
Dominik Farka et al. "Reversible Photochemical Isomerization of N, N'-Di(t-butoxycarbonyl) indigos" J. Phys. Chem. A 2015, 119, 3563-3568.

* cited by examiner

XRD spectrum of the compound of formula (II)

¹H-NMR spectrum of di-tboc indigo $^{13}$C-NMR spectrum of di-tboc indigo $^1$H-NMR(CDCl$_3$) spectrum of mono-tboc indigo $^{13}$C-NMR (CDCl$_3$) spectrum of mono-tboc indigo

INDIGO-DERIVATIVES AS IRREVERSIBLE COLOR CHANGEABLE DYES FOR TEXTILE MATERIALS AND PROCESS FOR DYEING TEXTILE MATERIALS

RELATED APPLICATIONS

This application is related to, and claims priority to, European application EP 16174973.4, filed 17 Jun. 2016 and entitled "Use of Indigo-Derivatives as Irreversible Color Changeable Dyes for Textile Materials, Novel Compounds and a Process for Dyeing Textile Materials," the contents of which are hereby incorporated by reference, as if set forth in their entirety.

TECHNICAL FIELD

Color changeable dyes (chromic dyes) are known and used in many applications like coating materials, optics, photo-storage instruments and optical sensors.

As a suffix, "chromic" means reversible change of color and by extension, a reversible change of other physical properties. This external stimulus can be light, heat, electric current, pressure, a solvent or an electron beam.

There is an existing need for irreversible color changeable dyed textile materials, especially denim, i.e., materials colored with dyes which can change under conditions which are not accessible in domestic use and which can offer different shades or features of artistic quality when the material is appropriately stimulated, in a controlled manner, for example by heat treatment, laser abrasion, acid application, etc.

To date, no irreversible color changeable dye having affinity for denim is known. Indeed, although some thermosensible and photo-sensible dyes are known and used in the textile industry, these types of dyes cannot be used directly for dyeing denim, as they do not have affinity for denim substrates.

SUMMARY

An object of the invention is to provide the use of indigo-derivatives for irreversible color changeable dyeing textile materials, especially denim.

It is a further object of the invention to provide a process for irreversible color changeable dyeing textile materials, especially denim.

It is a further object of the invention to provide garments made by the textile materials dyed with irreversible color changeable indigo-derivatives. The garments and the textile materials may be further processed to provide different shades of colors and/or to create artistic features.

It is a further object of the invention to provide new compounds which can be used as irreversible color changeable dyes for textile materials, especially denim.

These and further objects will be achieved by the subject-matter of the invention, as it will be herein below disclosed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is best understood from the following detailed description when read in conjunction with the accompanying drawings. It is emphasized that, according to common practice, the various features of the drawings are not necessarily to scale. On the contrary, the dimensions of the various features may be arbitrarily expanded or reduced for clarity. Like numerals denote like features throughout the specification and drawings.

DETAILED DESCRIPTION

Figure 1:
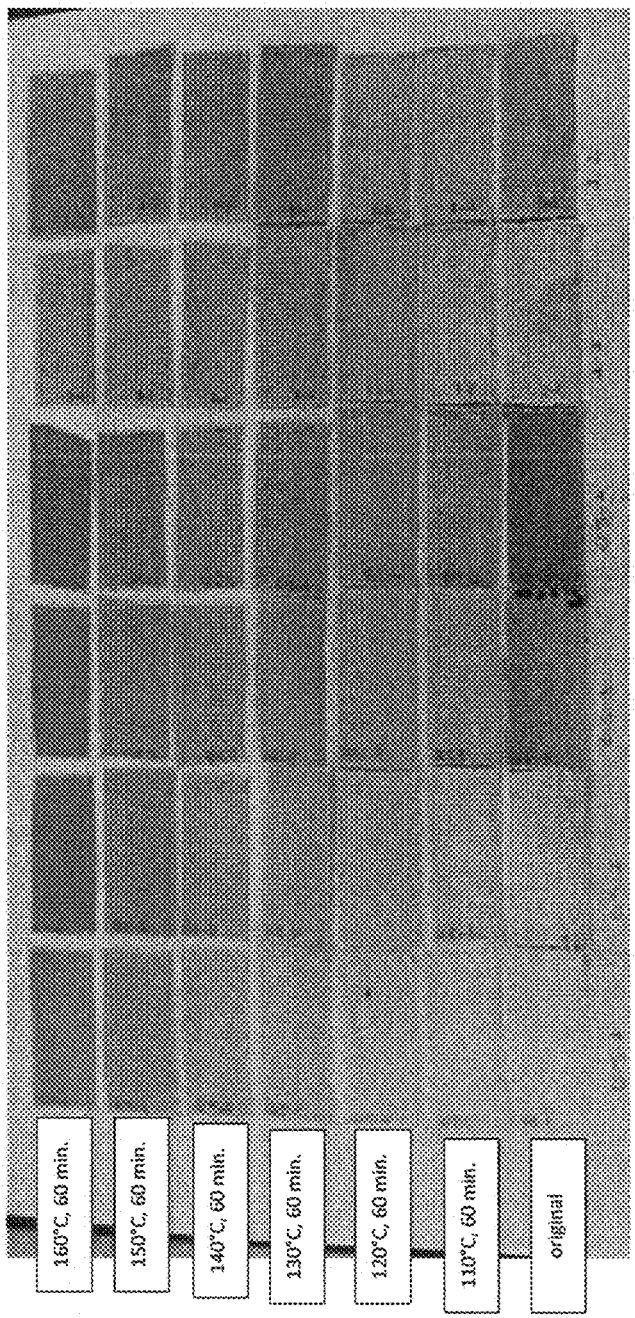
FIG. 1 shows a textile material dyed according to various embodiments of the invention after thermal treatment.

According to one of its aspects, the present invention relates to the use of indigo-derivatives of formula (I)

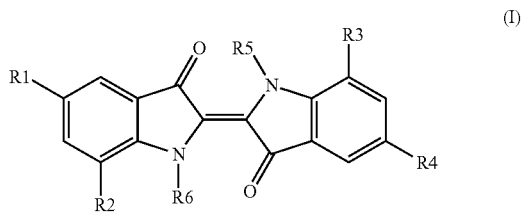

wherein
$R_1$, $R_2$, $R_3$ and $R_4$ are, each independently a hydrogen atom or a halogen atom, and
$R_5$ and $R_6$ are, each independently, a hydrogen atom or a tert-butoxycarbonyl group (t-BOC), provided that $R_5$ and $R_6$ are not both hydrogen,
as dyes for textile materials.

According to embodiments of the present invention, the indigo-derivatives of formula (I) are used as irreversible color changeable dyes in an irreversible color changeable dyeing process.

The expression "irreversible color changeable dyeing process" herein indicates an industrial dying process which includes treating a textile material with dyes that, once applied to provide a color to said textile material, can be altered and converted to one or more other colors. Hence, according to the process of embodiments of the invention, a first color is provided to a textile material by applying the indigo-derivatives of the invention, then said first color can be changed into another or more other colors, which are herein referred to as "terminal colors", by applying an external stimulus or further external stimuli to said textile material.

Accordingly, by "irreversible color changeable dye" is herein meant a dye which reacts to an external stimulus by changing its color, under conditions which are not accessible in conventional domestic use.

The expression "external stimulus" herein indicates for example light (photochromic), heat (thermochromic), electric current (electrochromic), pressure (piezochromic), a solvent (solvatochromic) or an electron beam (cathodochromism) or a laser beam.

According to some embodiments, the external stimulus is selected from light, heat and laser.

According to the disclosure "textile materials" refers to any material suitable to prepare fabrics, such as, yarns and ready for dyeing fabrics.

The expression "ready for dyeing fabrics" means a fabric which has undergone the desizing, mercerization and washing steps.

Suitable substrates for dyeing according to embodiments of the invention are all cellulose type and/or blend yarns including, but not limited to, cotton, wool, linen, viscose and mixture thereof.

The textile material may be a stitched, woven, knitted, and non-woven fabric.

The textile material may advantageously be denim.

According to an embodiment, $R_1$, $R_2$, $R_3$ and $R_4$ are all a hydrogen atom and $R_5$ and $R_6$ are both a tert-butoxycarbonyl group.

According to another embodiment, $R_1$, $R_2$, $R_3$ and $R_4$ are all a hydrogen atom and one of $R_5$ and $R_6$ is a hydrogen atom and the other is a tert-butoxycarbonyl group.

According to another embodiment, $R_1$, $R_2$, $R_3$ and $R_4$ are all halogen atoms.

According to another embodiment two of $R_1$, $R_2$, $R_3$ and $R_4$ are a hydrogen atom and the other two are a halogen atom.

According to another embodiment two of $R_1$, $R_2$, $R_3$ and $R_4$ are a hydrogen atom, $R_2$ and $R_3$ are a hydrogen atom and $R_5$ and $R_6$ are both a tert-butoxycarbonyl group.

According to another embodiment two of $R_1$ and $R_4$ are a hydrogen atom and $R_2$ and $R_3$ are a halogen atom.

According to another embodiment two of $R_1$ and $R_4$ are a hydrogen atom and $R_2$ and $R_3$ are a bromine atom.

According to another embodiment two of $R_1$ and $R_4$ are a halogen atom and $R_2$ and $R_3$ are a hydrogen atom.

According to another embodiment two of $R_1$ and $R_4$ are a bromine atom and $R_2$ and $R_3$ are a hydrogen atom.

According to another embodiment two of $R_1$ and $R_4$ are a bromine atom and $R_2$ and $R_3$ are a hydrogen atom and $R_5$ and $R_6$ are both a tert-butoxycarbonyl group.

According to another embodiment, $R_1$, $R_2$, $R_3$ and $R_4$ are all a bromine atom.

According to another embodiment, $R_1$, $R_2$, $R_3$ and $R_4$ are all a bromine atom and one of $R_5$ and $R_6$ is a hydrogen atom and the other is a tert-butoxycarbonyl group.

According to another embodiment, $R_1$, $R_2$, $R_3$ and $R_4$ are each chlorine atoms.

According to another embodiment, the indigo-derivatives of formula (I) are used in an irreversible color changeable dyeing process for denim.

It was surprisingly found out that the compounds of formula (I) can be used as dyes in irreversible color changeable dyeing processes, especially on denim, to obtain various colour from one single dye, from magenta to blue or from purple to blue. Indeed, the above compounds can irreversibly change their color under specific conditions (like heat, laser, etc.).

According to another of its aspects, the invention relates to new indigo-derivatives of formula (I) wherein $R_1$, $R_2$, $R_3$ and $R_4$ are all a halogen atom. $R_1$, $R_2$, $R_3$ and $R_4$ may each advantageously be the same halogen atom.

According to various embodiments, the invention relates to the new indigo-derivatives of formula (I) wherein $R_1$, $R_2$, $R_3$ and $R_4$ are all a bromine atom, i.e., to the compound of formula (II)

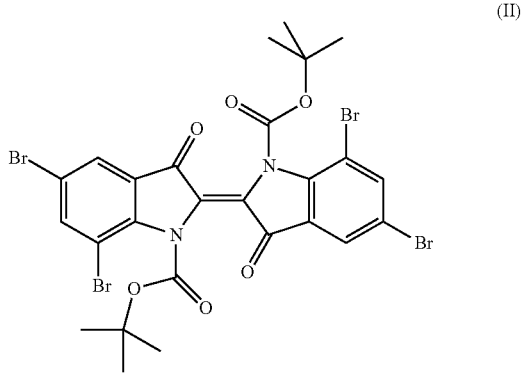 [SMILES: CC(C)(C)OC(=O)N1/C(=C2\C(=O)c3cc(Br)cc(Br)c3N2C(=O)OC(C)(C)C)C(=O)c2cc(Br)cc(Br)c21]

According to various embodiments, the invention relates to the new indigo-derivatives of formula (I) wherein $R_1$, $R_2$, $R_3$ and $R_4$ are all a hydrogen atom and one of $R_5$ and $R_6$ is a hydrogen atom and the other is a tert-butoxycarbonyl group.

According to another of its aspects, the invention relates to a process for irreversible color changeable dyeing textile materials, which comprises applying an indigo-derivative of formula (I) onto a textile material and subsequently applying one or more stimuli in order to configure the textile material surface.

Only one or a mixture of the indigo-derivatives of formula (I) may be used in the process of the invention.

The dyeing process can be performed according to the techniques known in the art.

It is important to be noticed that for carrying out the new process, conventional production plant lines may be used, which is of great importance from an industrial point of view.

In order to increase dye uptake a pre-reduction technique disclosed in the application US2007/0033748 (corresponding to EP1913195) may be performed. The contents of said two patents are herein incorporated by reference.

The dye application and the subsequent skying sequence may advantageously be repeated multiple times, for instance at least two times. In some embodiments, it may be repeated 4 to 8 times, in order to increase dye loading.

Impregnation and skying periods may be slightly different with respect to the ones used with conventional indigo-blue dyes. As an example, impregnation time may vary between 10 to 30 seconds, and in some embodiments may vary from 15 to 25 seconds, and may be 18 to 20 seconds in some embodiments. The skying time may be 30 to 300 seconds, and may advantageously be 90 to 240 seconds.

The dyeing temperature is generally comprised between 20° C. and 90° C., and may range from 35-45° C., and in some embodiments may range from 25 to 30° C.

In the above conditions, dye loading was excellent without losing the known "ring effect".

By the term "configure" it is herein meant that the appearance of the textile material, for instance its color, is changed by the application of an external stimulus.

As said, the color of the textile material such as denim, manufactured by the process of the invention may be changed by using external stimuli, as disclosed above.

Indeed, the present invention enables the production textile material of different shades of colors and, if desired, the creation of the artistic features is also possible by using in different stimulus applications.

As an example, it has been observed that, by dry heat treatment after impregnation, interesting surface abrasion effects may be obtained on the textile materials dyed according to the invention.

Also, wet heat treatment after impregnation results in irreversible colour change and dry and wet laser treatment results in multi-colour abrasion effects which are not achievable on textiles treated with conventional indigos.

As an example, when using laser abrasion, laser duty cycle, power, and pulse duration may be varied to create a pallet of different colors and shades with three terminal colors. Parameters may be decided for specific image types and applied accordingly.

If the laser power further increases, then the dye molecules-together with some portions of the base fabric-decays and decomposes to other species, burns or sublimates, reaching the color of the base fabric. This way, a much more complex image can be created on the surface of a garment.

For instance, considering laser applications, where a laser beam is directed towards the surface of the fabric in order to create "shades" or features of artistic quality, normally the application has two terminal colors: the color of the dye (when no abrasion) and the color of the base fabric (complete abrasion of dye). Usually the color of the base fabric is white, which is not an actual color; therefore, hue is almost always the same. What changes is the "shade", a term used in textile industry. In our invention, however, there would be 3 terminal colors. Assuming the color of the base fabric is white, which is again not an actual color, there are two actual colors which allows actual hue changes in between. When laser power is low, meaning no abrasion, the color of the surface would be close to the color of the fabric. As the laser power increases, the surface color would start gradually change and move from a first terminal color to a second terminal color where a chemical change in the dye molecule takes place. During this application different hues are accessible because both the first and second terminal colors are actual hues and when mixed, other hues can be reached.

By heat treatment, i.e., using hot air to alter the color of the whole fabric or, tightly controlling the heated surfaces, touching the fabric surface it is possible to create patterns with desired hue and shade.

Any color, from magenta to blue or from purple to blue may be achieved by using the irreversible color changeable dyes of the invention.

FIG. 1 shows a textile material dyed according to the invention, after thermal treatment. As it can be seen, color (magenta) can be changed depending on the temperature and dwelling time used in the dyeing process.

Figure 2:
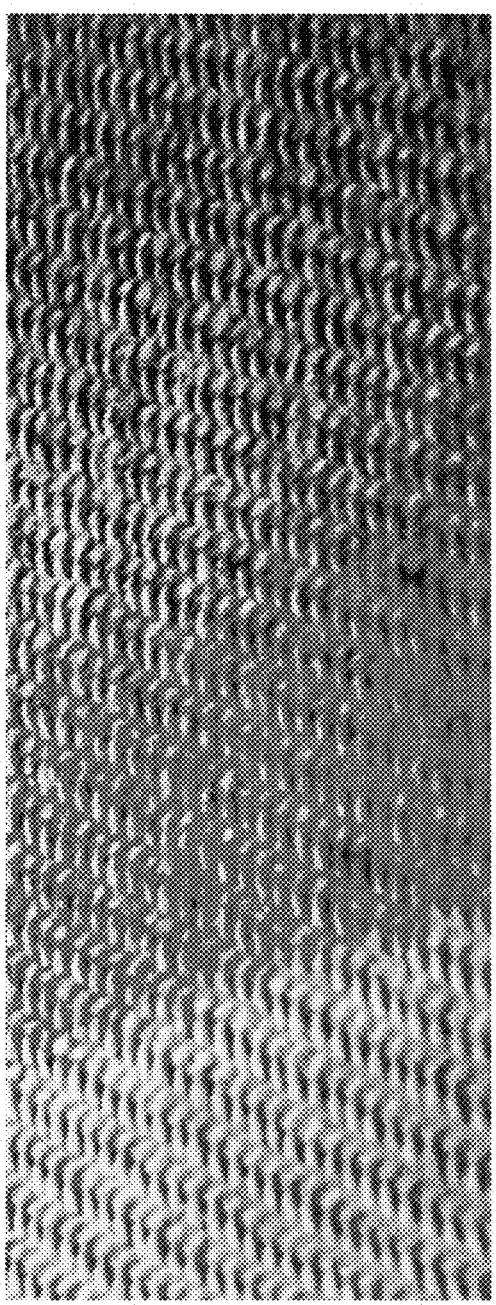
FIG. 2 shows a textile material dyed according to embodiments of the invention after laser treatment.

FIG. 2 shows a textile material which has been laser treated. Depending on the laser power and dwelling time, different colors may be obtained ((A), (B) and (C)).

As such, the use of the indigo-derivatives of formula (I), especially of the preferred ones and especially the compounds of formula (II), makes it possible to produce textile materials having a color which is changeable under conditions which are not accessible in domestic use, such as for instance high temperatures like 160° C., and thus fixed at the production site.

The textile material dyed and further processed according to the invention is another subject-matter of the invention and it may be used to produce clothing garments such as, but not limited to, pants, skirts, shirts, hats and jackets.

A garment article obtained by the textile material dyed and further processed, according to the invention is another subject-matter of the invention.

As an alternative, the textile material dyed according to the invention is used to produce garment articles and, afterwards, said garment articles are processed to alter their color as above explained; otherwise said, garment articles may be directly dyed with the indigo derivatives of the invention as well. A garment article obtained by the textile material dyed according to the invention and then further processed as disclosed above is another subject-matter of the invention.

The indigo-derivatives may be prepared by processes known in the art, for instance according to the following Scheme

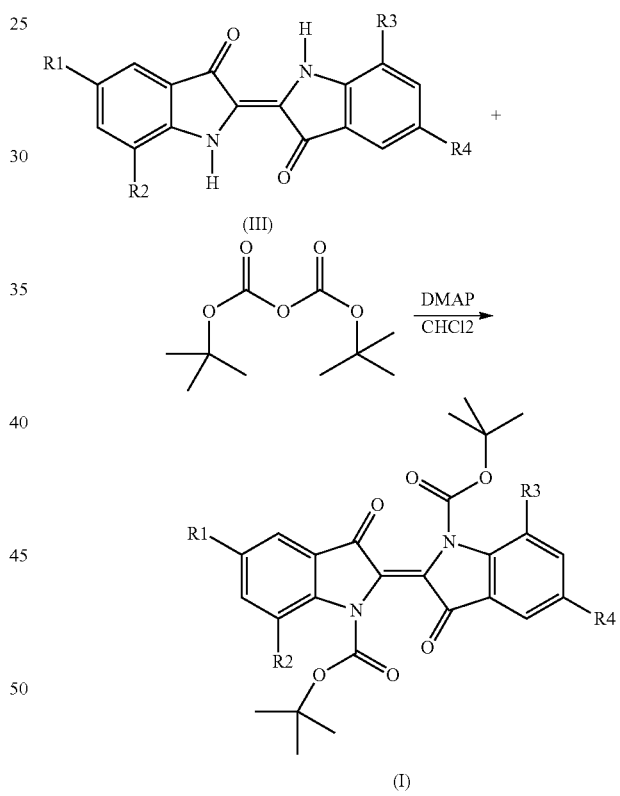

wherein $R_1$, $R_2$, $R_3$ and $R_4$ are as above defined.

Compounds of formula (I) and (III) are known or may be prepared according to the methods known in the art.

The reaction of Scheme 1 may be carried out by stirring the compounds of formula (III) in an organic solvent, such as dichloromethane ($CH_2Cl_2$), at room temperature with ≥two equivalents of di-tert-butyl dicarbonate ($tBOC_2O$) and about one equivalent of a base, such as and N,N'-dimethyl-aminopyridine (DMAP). The reaction is completed in 1-3 days (the reaction may be monitored for instance by thin layer chromatography). To work-up different alternative ways can be used. For instance, the reaction mixture may be concentrated almost to dryness and filtrated, for example on the 80-fold amount of silica gel with toluene/ethyl acetate (9:1) to give the products in yields up to 90%. For their analysis, the samples may be recrystallized from a suitable solvent, such as ethyl acetate. As an alternative, the reaction solvent is removed under pressure at low temperature, then water is added onto the solid form is stirred, for instance for 30 minutes, and filtrated, such as with a sintered disc filter funnel. Then HCl is added, for instance HCl 2M, and the mixture is stirred. In some embodiments, the mixture is stirred overnight and afterwards, it is filtrated, such as with a sintered disc filter funnel and dried. The drying may take place at a temperature below 60° C.

Other possible reaction conditions and work-up may however be carried out, according to the methods known to the skilled in the art.

The compounds of formula (I) wherein one of $R_5$ and $R_6$ is a hydrogen atom and the other is a tert-butoxycarbonyl group, can be synthesized by using only one equivalent of di-tert-butyl dicarbonate ($tBOC_2O$) in the above disclosed reaction scheme.

The synthesis of the compound of formula (II) is disclosed in the Experimental Section herein below.

EXPERIMENTAL SECTION

Example 1

Preparation of 1,1'-bis(tert-butoxycarbonyl)-bis(5,7,5',7'-tetrabromo-indolidene)-3,3'-dione (Bis-tBOC-5,7,5',7'-tetrabromoindigo; Compound of Formula (II)

1,1'-bis(5,7,5',7'-tetrabromo-indolidene)-3,3'-dione (one equivalent) is stirred in dichloromethane, at room temperature, with ≥four equivalents of $tBOC_2O$ and about two equivalent of DMAP, for 1-3 days. The reaction mixture is concentrated almost to dryness to give the compound of the title (yield 90%). If desired, the compound may be purified by crystallization in AcOEt.

Figure 3:
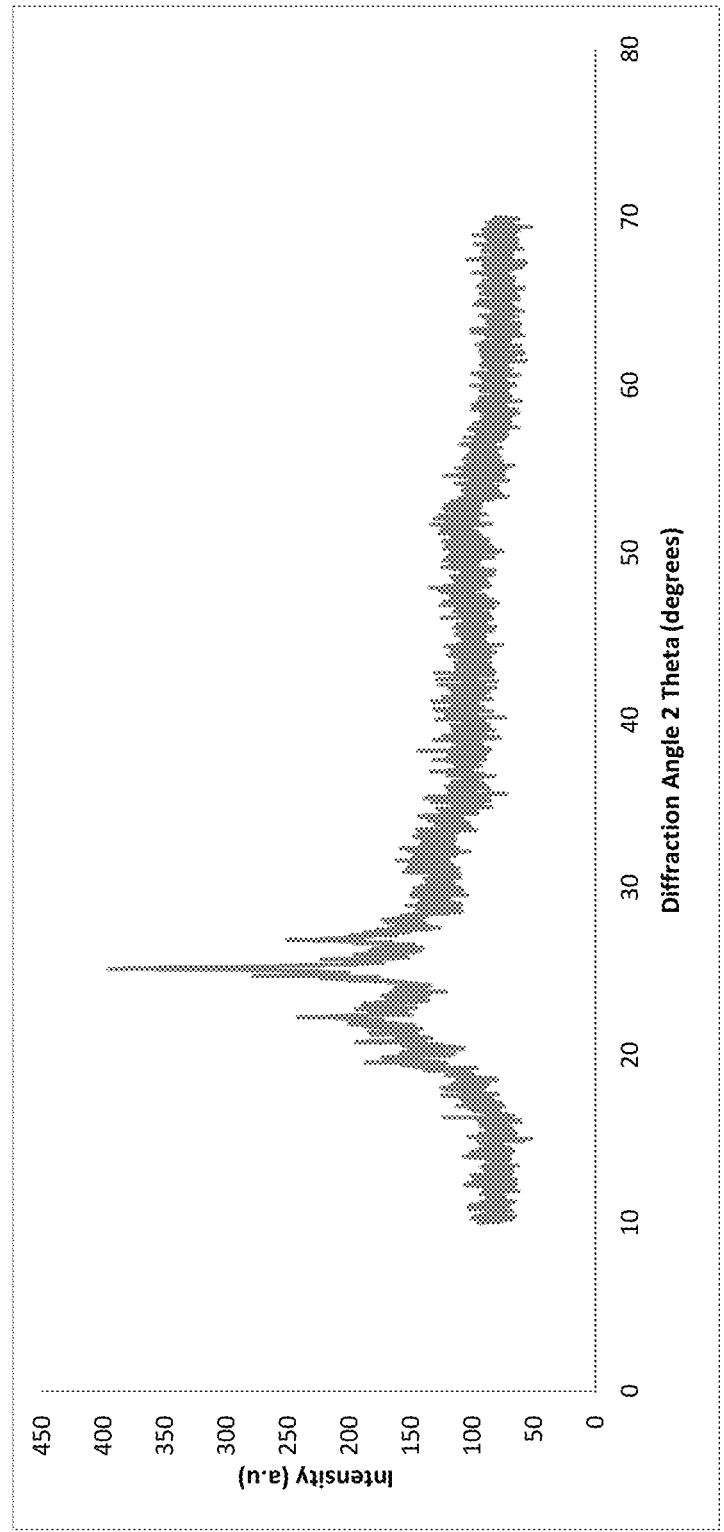
FIG. 3 is a graphical presentation showing the XRD spectrum of the compound of formula (II)
Figure 4:
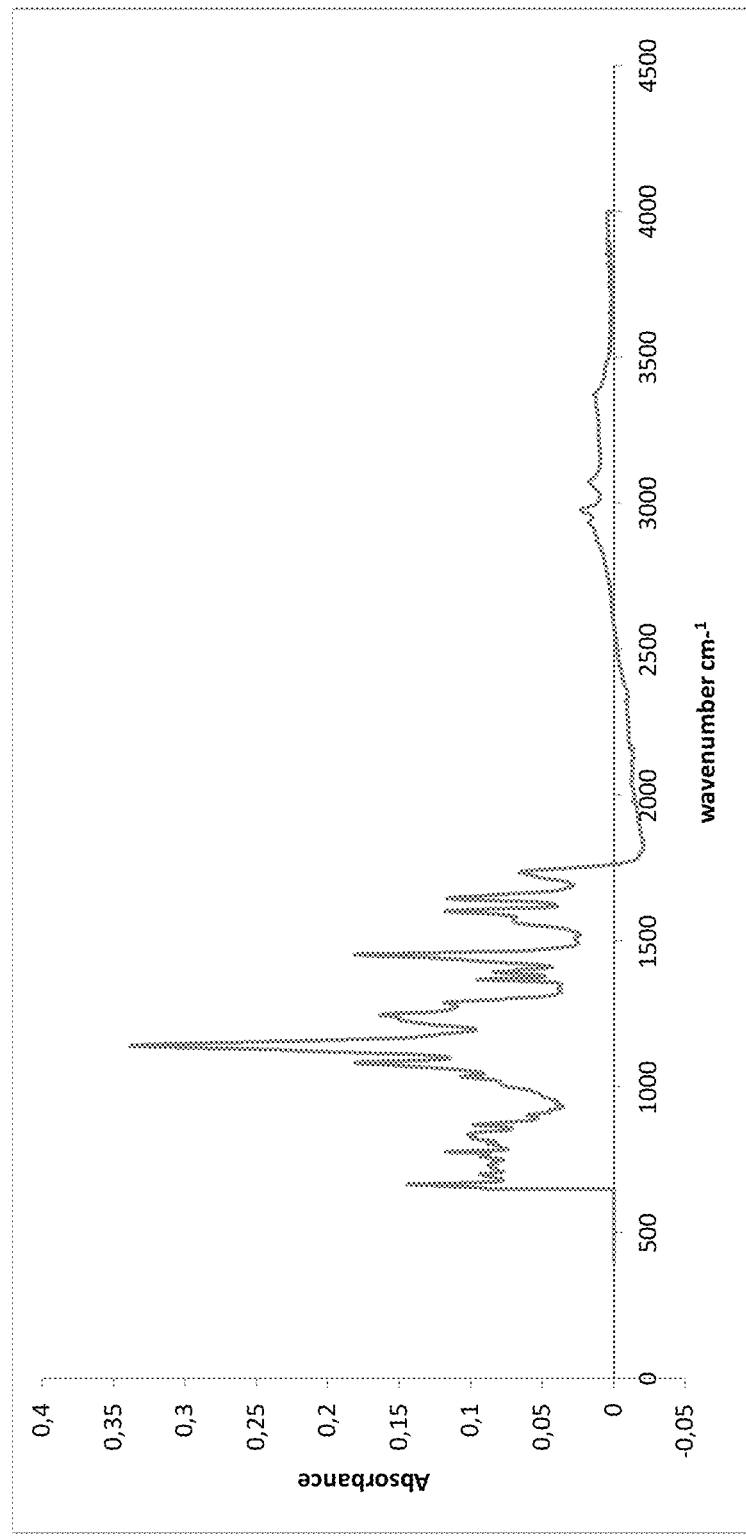
FIG. 4 is a graphical presentation showing the FT-IR spectrum of the compound of formula (II)
Figure 5:
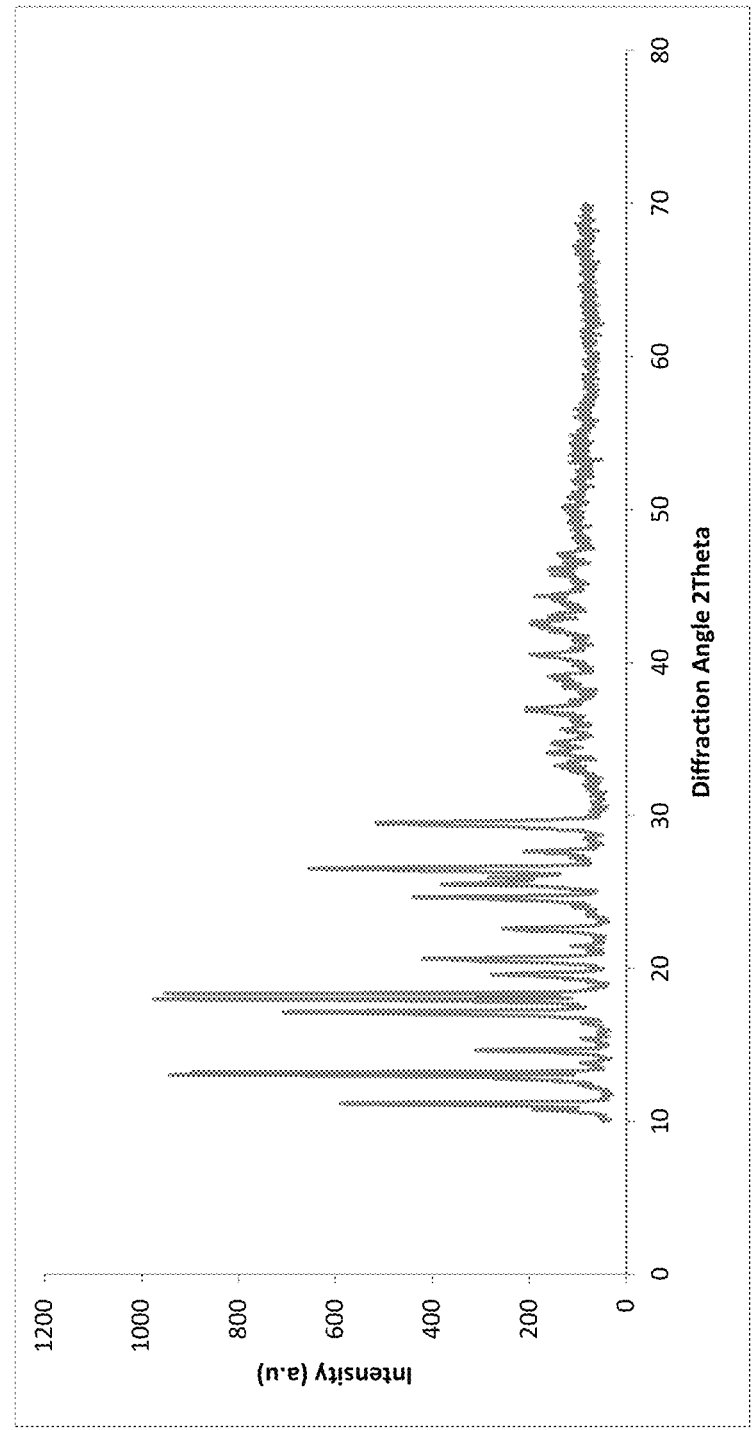
FIG. 5 is a graphical presentation showing the XRD spectrum of the compound (I) wherein $R_1$, $R_2$, $R_3$ and $R_4$ are H and $R_5$ and $R_6$ are both t-BOC.
Figure 6:
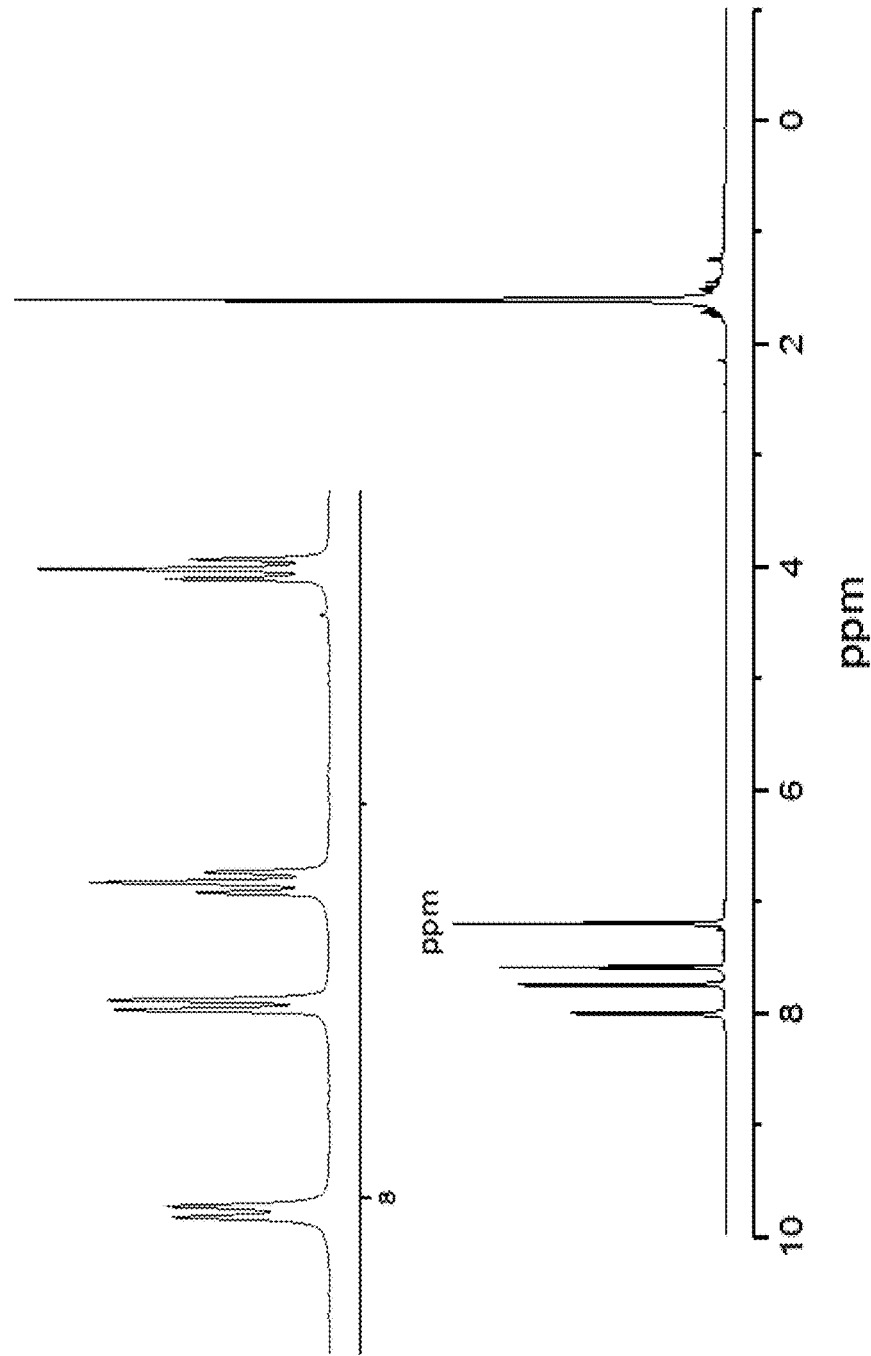
FIG. 6 is a graphical presentation showing the $^1$H-NMR spectrum of the compound (I) wherein $R_1$, $R_2$, $R_3$ and $R_4$ are H and $R_5$ and $R_6$ are both t-BOC.
Figure 7:
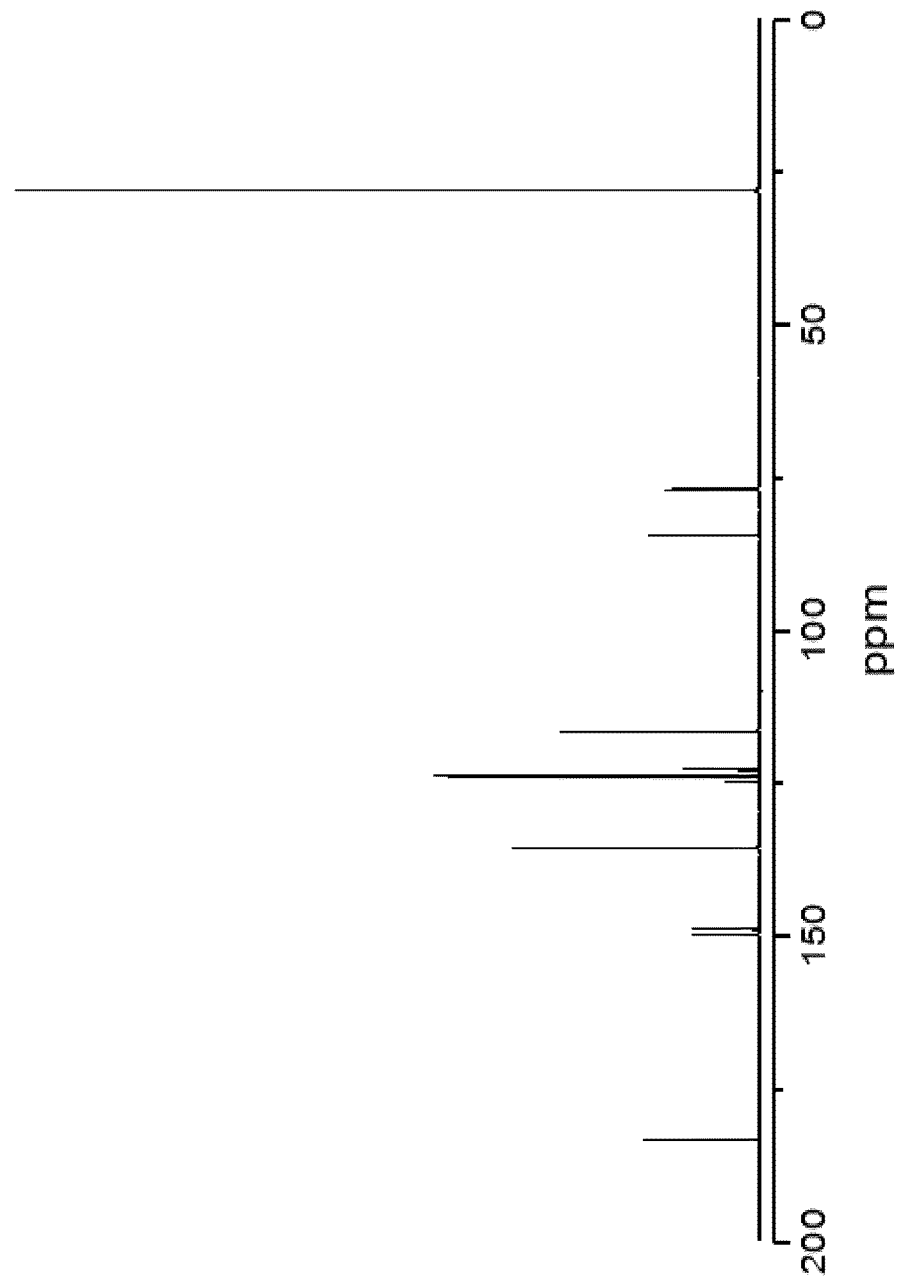
FIG. 7 is a graphical presentation showing the $^{13}$C-NMR spectrum of the compound (I) wherein $R_1$, $R_2$, $R_3$ and $R_4$ are H, $R_5$ and $R_6$ are both t-BOC.
Figure 8:
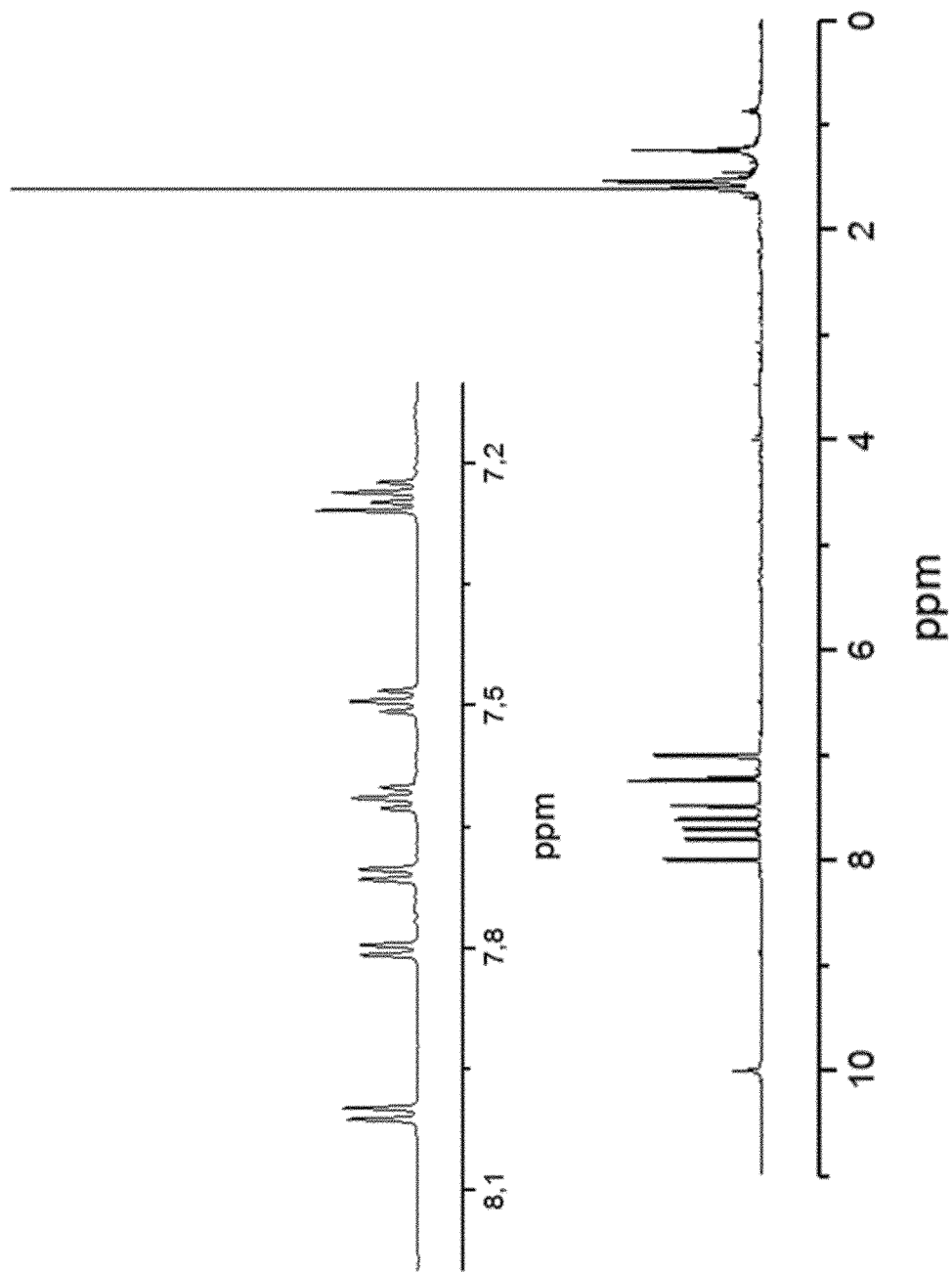
FIG. 8 is a graphical presentation showing the $^1$H-NMR spectrum of the compound (I) wherein $R_1$, $R_2$, $R_3$ and $R_4$ are H, one of $R_5$ and $R_6$ is H and the other is t-BOC.
Figure 9:
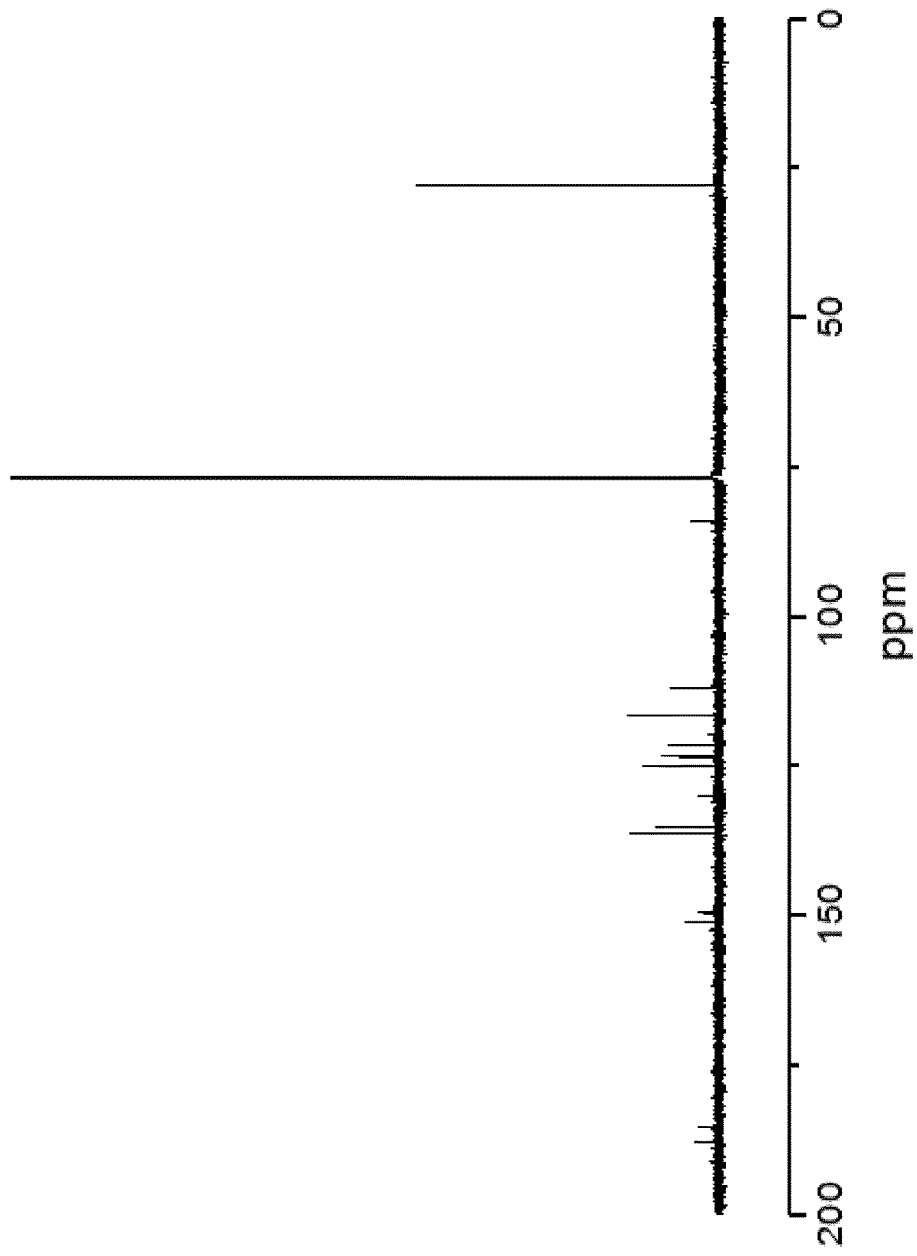
FIG. 9 is a graphical presentation showing the $^{13}$C-NMR spectrum of the compound (I) wherein $R_1$, $R_2$, $R_3$ and $R_4$ are H, one of $R_5$ and $R_6$ is H and the other is t-BOC.

FIGS. 3 and 4 shows the XRD (X-Ray Diffraction) and FT-IR (Fourier transformed infrared spectroscopy) spectra of the tile compound.

Example 2

Preparation of 1,1'-bis(tert-butoxycarbonyl)-bis(5,7,5',7'-tetrabromo-indolidene)-3,3'-dione (Bis-tBOC-5,7,5',7'-tetrabromoindigo; Compound of Formula (II)

1,1'-bis(5,7,5',7'-tetrabromo-indolidene)-3,3'-dione (one equivalent) is stirred in dichloromethane, at room temperature, with ≥four equivalents of $tBOC_2O$ and about two equivalent of DMAP, for 1-3 days. The reaction solvent is removed under pressure at low temperature, then water is added onto the solid form is stirred, for instance for 30 minutes, and filtrated, advantageously with a sintered disc filter funnel. Then HCl is added, for instance HCl 2M, and the mixture is stirred, optionally overnight and afterwards, it is filtrated, such as with a sintered disc filter funnel and dried. The drying may take place at a temperature below 60° C.

Example 3

Dyeing Process 8 g of the compound of Example 1 are reduced in presence of NaOH (11 ml, 48 baume) and $Na_2S_2O_4$ (10 g) in to the 250 mL water. At the room temperature, fabrics are dyed using lab type pad-batch machine (dipping time: 10 to 25 seconds, oxidation time 90 to 210 seconds).

The above process may be scaled up for production line.

Example 4

Further Processing of Textile Materials Dyed According to Example 3

Dry textile materials dyed according to example 3 are heated with laboratory type oven or stenter. Depending on the temperature and dwelling time, various colors may be obtained. As an alternative all process could be applied onto the wet textile materials dyed according to example 3.

For the laser application, wet or dry textile materials are exposed to a laser beam. Depending on the laser power, duty cycle and application speed, different effects, such as color, shade, etc.) can be obtained.

Although the invention has been described in terms of various embodiments, it is not limited thereto. Rather, the appended claims should be construed broadly, to include other variants and embodiments of the disclosed invention, which may be made by those skilled in the art without departing from the scope and range of equivalents of the invention.

The invention claimed is:

1. A process for dyeing textile materials, said process comprising applying an indigo-derivative of formula (I)

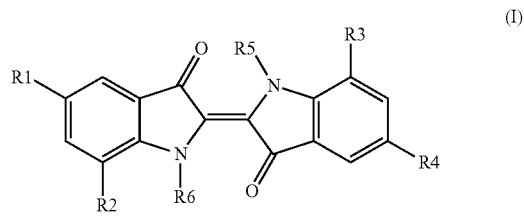

wherein
$R_1$, $R_2$, $R_3$ and $R_4$ each represent a hydrogen atom or a halogen atom, provided that $R_1$, $R_2$, $R_3$ and $R_4$ are not all hydrogen atoms and
$R_5$ and $R_6$ each represent a hydrogen atom or a tert-butoxycarbonyl group, provided that $R_5$ and $R_6$ are not both hydrogen,
onto a textile material.

2. The process according to claim 1, wherein said process is an irreversible color changeable dyeing process.

3. The process according to claim 1, wherein each of said $R_1$, $R_2$, $R_3$ and $R_4$ comprises a halogen atom.

4. The process according to claim 3, wherein each said halogen atom comprises a bromine atom.

5. The process according to claim 1, wherein one of said $R_5$ and said $R_6$ is a hydrogen atom and the other of said $R_5$ and said $R_6$ comprises a tert-butoxycarbonyl group.

6. The process according to claim 1, wherein said textile material is denim.

7. The process according to claim 1, wherein said textile material comprises cotton, wool, linen, viscose, or a mixture thereof.

8. The process according to claim 1, further comprising subsequently processing said textile material with one or more external stimuli, to configure a surface of said textile material.

9. The process according to claim 8, wherein said textile material comprises one of cotton, wool, linen, viscose and a mixture thereof.

10. The process according to claim 8, wherein said textile material is denim.

11. The process of claim 1, further comprising, after said applying, forming said textile material into a garment article then processing said garment article with one or more external stimuli, in order to configure a surface of said garment article.

12. An indigo-derivative of formula (I)

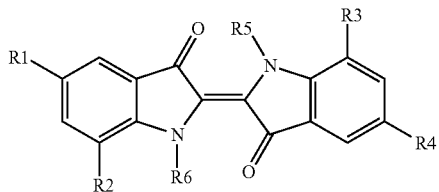

wherein each of said $R_1$, $R_2$, $R_3$ and $R_4$ comprises a halogen atom and $R_5$ and $R_6$ are, each independently, a hydrogen atom or a tert-butoxycarbonyl group (t-BOC), provided that $R_5$ and $R_6$ are not both hydrogen.

13. The indigo-derivative according to claim 12, wherein each of said $R_1$, $R_2$, $R_3$ and $R_4$ comprises a bromine atom and formula (I) comprises formula (II)

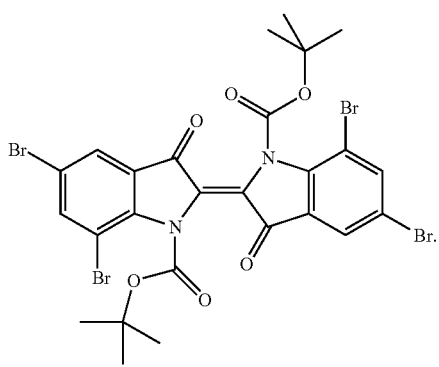

14. Indigo-derivatives of formula (I)

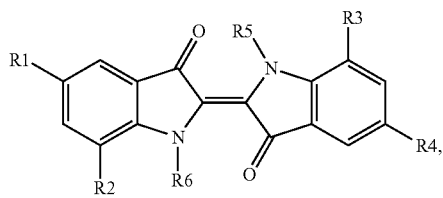

wherein each of said $R_1$, $R_2$, $R_3$ and $R_4$ comprises a hydrogen atom, one of said $R_5$ and said $R_6$ is a hydrogen atom and the other of said $R_5$ and said $R_6$ comprises a tert-butoxycarbonyl group.

15. A textile material dyed according to the process of claim 1.

16. A textile material formed according to the process of claim 8.

17. A garment article dyed according to the process of claim 1.

18. A garment article formed according to the process of claim 8.

19. The process according to claim 1, wherein two of $R_1$, $R_2$, $R_3$ and $R_4$ are a hydrogen atom and the other two are a halogen atom.

20. The process according to claim 1, wherein $R_1$ and $R_4$ are a hydrogen atom and $R_2$ and $R_3$ are a halogen atom.

21. The process according to claim 1, wherein $R_1$ and $R_4$ are a halogen atom and $R_2$ and $R_3$ are a hydrogen atom.

22. The process according to claim 1, wherein $R_1$, $R_2$, $R_3$ and $R_4$ are each a chlorine atom.

* * * * *